United States Patent Office 2,819,246
Patented Jan. 7, 1958

2,819,246

MOLDING COMPOSITIONS OF BENZOGUANAMINE-FORMALDEHYDE REACTION PRODUCT AND BUTADIENE-ACRYLONITRILE COPOLYMER RUBBER

Richard Lindenfelser, Darien, and Martha K. Layman nee Martha K. Kilthau, Stamford, Conn., assignors to American Cyanamid Company, New York, N. Y., a corporation of Maine No Drawing. Application December 1, 1954
Serial No. 472,506

1 Claim. (Cl. 260—45.2)

This application is a continuation-in-part of our copending application Serial No. 183,098, filed September 2, 1950, and now abandoned.

This invention relates to molding compositions and, more particularly, to molding compositions capable of producing molded articles having high impact strength, good insert crack resistance and good deflection.

In the past, thermoset molding compounds having high impact strength and good insert crack resistance have been produced by the incorporation of long-fibered fillers such as chopped string or rags with thermosetting resins. The resulting compositions, however, possess the disadvantages of poor flow and handling characteristics and high bulk factor. Moreover, the surfaces of molded pieces made from these compositions have a mottled appearance which is generally objectionable.

In an attempt to overcome the above disadvantages, copolymers of acrylonitrile and butadiene have been admixed with phenolic resin. Molded articles produced from such compositions have good insert crack resistance and high impact strength but their color is very poor, thus seriously limiting their applications. Molding compounds containing melamine or urea resins, on the other hand, yield molded articles having good color but such resins are incompatible with elastomers such as the acrylonitrilebutadiene copolymers.

It is an object of the present invention to provide molding compositions which are light in color and, in addition, have good flow and handling characteristics and low bulk factor.

It is another object of the present invention to provide molded articles which are light in color and possess high impact strength, good insert crack resistance and good deflection.

The above and other objects are attained by incorporating a particular modifier, in a particular range of proportions, with certain triazine-aldehyde resins with which the modifier is compatible. This modifier is a synthetic, rubbery or rubber-like polymer (synthetic elastomer) which is compatible with the triazine-aldehyde resin employed and wherein any esterified acid groups are those of an esterified inorganic acid.

The invention will be described in greater detail in conjunction with the following specific examples in which proportions are given in parts by weight unless otherwise noted. It is understood, of course, that the details of the examples are merely illustrative and the scope of the invention is not to be limited thereto.

EXAMPLE 1

39 parts of resin "A."
21 parts of a butadiene-acrylonitrile copolymer containing about 40% acrylonitrile ("Hycar OR 15").
40 parts of alpha cellulose pulp.
1.6 parts of benzoic acid.
1.1 parts of zinc oxide.
0.3 part sulphur.
0.3 part benzothiazyldisulfide.
1.0 part zinc stearate.

The copolymer is sheeted on heated differential rolls with the front fast roll at 240° F. and the back slow roll cold. The resin is then added and the rolling continued until a uniform blend is obtained. The remaining ingredients, i. e., filler, catalysts and lubricants, are then added and the blend is milled for from 11 to 14 minutes until the desired plasticity is obtained.

EXAMPLE 2

36 parts of resin "A."
24 parts of a copolymer of styrene and isobutylene ("S Polymer").
40 parts of alpha cellulose pulp.
1.4 parts benzoic acid.
1.2 parts zinc oxide.
0.4 part sulphur.
0.4 part benzothiazyldisulfide.
1.0 part zinc stearate.

The above ingredients are blended in a Baker-Perkins mixer, and the blend is then milled for from 3½ to 6 minutes on heated differential rolls with the front fast roll at 240° F. and the back slow roll cold until the desired plasticity is obtained.

EXAMPLE 3

34.6 parts of resin "A."
25.4 parts of a butadiene-acrylonitrile copolymer containing about 40% acrylonitrile in admixture with filler and lubricant in proportions of 90 parts of copolymer to 10 parts of filler and lubricant.
30 parts of alpha cellulose pulp.
1.4 parts benzoic acid.
1.3 parts zinc oxide.
0.3 part benzothiazyldisulfide.
10 parts calcium carbonate.

The procedure of Example 2 is followed.

EXAMPLE 4

Standard molded test pieces for ASTM tests and transfer moldings around both square and round steel inserts are prepared at 310° F. and 3700 p. s. i. Properties of the moldings are as follows:

| | Ex. 1 | Ex. 2 | Ex. 3 |
|---|---|---|---|
| Apparent density, g./100 ml.. | 51 | 44 | 59. |
| Flow mold flow, mils | 43 | 38 | 32. |
| Deflection, mils | 417 | 152 | 236. |
| Impact strength: | | | |
| Ski ball, ft. lb./in. notch.. | no break; too flexible. | 0.216 | 0.375. |
| Izod, ft. lb./in. notch | 0.97 | 0.27 | 0.393. |
| Inserts, hrs. to crack at 300° F.: | | | |
| Round | no crack after 189. | 15 | no crack after 189. |
| Square | 60 | 15 | Do. |

A typical example of the use of the molding compositions of the present invention is in the molding of a curved fork handle. Owing to the relatively large metal insert and small molding, ordinary molding compounds are unsatisfactory because they crack on ejection from the mold or shortly thereafter. In addition, the curved handle is very susceptible to breakage, especially when downward pressure is exerted on the center of the arch as may occur, for instance, when a fork which has been dropped on the floor is accidentally stepped on. Curved fork handles molded from the compositions of the present invention, however, do not crack or craze and they are so flexible and so tough that the arch of the fork may be flattened without breaking.

Preparation of Resin "A"

18.7 parts (1.0 mol) of benzoguanamine.
16.2 parts (2.0 mols) of aqueous formaldehyde (37%).
0.1 part of 2 N sodium hydroxide solution.

The benzoguanamine and formaldehyde are charged to a suitable reaction vessel, and the slurry pH is adjusted to 7.9 with 0.06 part of the sodium hydroxide solution. The mixture is heated to refluxing in 15 minutes and held at that temperature (94° C.) for three hours and 35 minutes until the solution becomes turbid and hydrophobic. The resin is then dehydrated in a vacuum of 52 cm. Hg until the temperature of the resin reaches 120° C. where it is held for ten minutes. The resin is then dumped onto shallow trays, cooled and ground.

Certain other triazine resins may be prepared according to the conditions set forth in the present specification and substituted for the resins of the specific example. In general, we have found suitable for our process aldehyde-condensation products of 4,6-diaminotriazines wherein the 2-position carries a substituent of such selected molecular weight that the triazine resin will be sufficiently compatible with the elastomer and will, at the same time, cure to a hard product, i. e., a substituent having at least two carbon atoms, no more than seven carbon atoms in the case of alkyl substitutents, and up to about ten carbon atoms in the cases of other than alkyl substitutents. If the molecular weight of this substituent is too low, the resin will be incompatible; if it is too high, the resin may not cure to a product of sufficient hardness for the intended purpose.

Thus, triazines which may be condensed with aldehydes and the resulting resins used in accordance with our process may be represented by the following general formula:

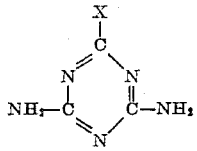

wherein X represents:

(a) A straight or branched chain, saturated or unsaturated, aliphatic hydrocarbon radical of from 2 to 7 carbon atoms as in, for example, propioguanamine, acryloguanamine, n-butyroguanamine, isobutyroguanamine, methacryloguanamine, sorboguanamine, n-valeroguanamine, caproguanamine, heptanoguanamine, caproguanamine, etc., or (b) A cycloaliphatic hydrocarbon radical as in, for example, $\Delta^3$-tetrahydrobenzoguanamine, hexahydrobenzoguanamine, 3-methyl-$\Delta^3$-tetrahydrobenzoguanamine, 3-methyl-hexahydrobenzoguanamine, 3,4-dimethyl-$\Delta^3$-1,2,5,6-tetrahydrobenzoguanamine, 3,4-dimethyl-hexahydrobenzoguanamine, etc., or (c) An aralkyl radical as in, for example, phenylacetoguanamine, tolylacetoguanamine, etc., or (d) An aryl radical as in, for example, benzoguanamine, the o-, m- and p-toluguanamines, the o-, m- and p-xyloguanamines, the alpha- and beta-naphthoguanamines, etc., or (e) An aryloxy radical as in, for example, 2-phenoxy-4,6-diamino-1,3,5-triazine, etc., or (f) A mono- or di- N-substituted amino group in which the N-substituents are any of the substituents of paragraphs (a), (b), (c) and (d), above, as in, for example, N-butylmelamine, N-phenylmelamine, N-cyclohexylmelamine, N-tolylmelamine, N,N-diallylmelamine, N,N-dibenzylmelamine, etc.

Mixtures of two, three or any other number of different 4,6-diaminotriazines of the kind embraced by the above formula may be used in place of a single such triazine if desired.

The guanamines which are useful as starting materials in the preparation of the above resins may be prepared by reaction of the corresponding nitrile, i. e., benzonitrile, phenylacetonitrile, and the like, with dicyandiamide as described in, for example, U. S. Patent No. 2,302,162 to Zermeck and Brunner. N,N-diallylmelamine is prepared by the same general type of process starting with diallylcyanamide (prepared from calcium cyanamide and allyl chloride) and dicyandiamide.

While we prefer the use of formaldehyde, either in aqueous solution or as paraformaldehyde, for condensation with the above-indicated triazines, other aldehydes or substances yielding an aldehyde such as acetaldehyde, propionaldehyde, valeraldehyde, furfural, trioxane, paraldehyde, benzaldehyde and the like may be employed. The combined molar ratios of aminotriazine to aldehyde can be varied from about 1:1 to about 1:4, the preferred range being from about 1:1.5 to about 1:2.5. To obtain light-colored products, aldehydes should be used that impart little or no color to the product, e. g., formaldehyde.

The pH of the condensation reaction involved in the preparation of the triazine resins which we have found suitable for use in the process of the present invention is not critical and may range anywhere from about 4 to about 11. We prefer operating in a pH of from about 6 to 9.

The temperature of the resin-forming condensation reaction should be sufficiently high to ensure dissolution of the initial reaction product in the solvent employed. This minimum temperature is about 60° C. The practical upper limit of the reaction temperature is the reflux temperature of the mixture when the reaction is carried out at atmospheric pressure. If higher pressures are used, the temperature may be increased, but it should not be above about 200° C. The preferred temperature range is generally from about 90° to about 105° C.

The aldehyde-aminotriazine condensation reaction must be permitted to proceed at least to the point where a 50% solution of the resin product in ethyl alcohol is stable as evidenced by the absence of any precipitate formation after 5 hrs. at 20°–25° C. At the same time, the reaction should not be allowed to proceed beyond the point where the condensation product has a plasticity or flow of about 60 mils, as determined by the following test:

A charge of fifty grams of the material at 20°–30° C. is placed in the center of the bottom platen of a molding press, both platens of which are at a temperature of 290±2° F. and which are so shaped and grooved as to produce a flat molded disc with concentric ridges the first of which is 1½ inches from the center of the disc, and which are spaced ½ inch apart, and each of which is 1/32 inch high, 1/16 inch wide at the top and with the sides sloping inwardly toward the top at an angle of 30° from the perpendicular. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils as a measure of the plasticity.

The actual reaction time for the resin-forming condensation reaction will, of course, be dependent on various factors such as solids concentration, pH, temperature and the like, but it is generally held to from about 10 minutes to about 1 hour.

The condensation reaction may be carried out in the absence of a solvent or, if desired, in the presence of such solvents as water or organic solvents including ketones, aldehydes, alcohols, hydrocarbons, esters, ethers, dioxane, etc., which are inert to, or do not form undesirable reaction products with, the resin-forming ingredients and the resin formed. Mixtures of any number of the organic type solvents may also be used in place of a single solvent. Generally, it is desirable to operate in the presence of water as a solvent and to avoid the use of alcohols or other hydroxyl-containing solvents or diluents.

After the condensation reaction has proceeded to its endpoint the resin will generally be in the form of an aqueous slurry. If so, it may be dried in any desired manner as, for example, by a spray drying operation, by kettle dehydration with or without vacuum, by dehydration in a revolving-arm mixing device such as a Baker Perkins or Readco mixer, by tray drying or by drum drying. Obviously little or no dehydration will be necessary if no water is present as, for example, when paraformaldehyde or an organic solvent is used in the preparation of the resin.

In arriving at the endpoint of the resin-forming condensation reaction, the total heating time, i. e., the heating time of reaction plus the heating time of concentration, must be considered. A simple test may be applied if, as we prefer, the condensation reaction is carried out in aqueous medium, i. e., formalin. Then it is only necessary to continue the condensation until the resin formed hydrophobes.

In order to prevent over-polymerization of the resin during the drying step, its pH should not be too low. It may not be necessary to adjust the pH if the condensation reaction was carried out at a pH above about 7, i. e., from about 7 to 11, but if the pH of reaction was in the range of from about 4 to less than about 7, it may be desirable to increase the pH to about 7 to 8.5 during drying.

The exact procedure for condensing a triazine with an aldehyde according to our teachings may be varied. All of the triazine and aldehyde may be reacted initially or, if desired, a portion of the aldehyde may be reacted initially with the triazine and the remaining added during a later stage of the process.

The synthetic, rubbery (rubber-like) polymers used in practicing the present invention are such polymers or synthetic elastomers which are compatible with the above-described resinous condensation product. Examples of such synthetic, rubber-like polymers, or synthetic elastomers, are:

(a) Homopolymeric butadiene and rubbery butadiene-styrene copolymers, more particularly such copolymers containing up to 50% styrene combined in the copolymer molecule, examples of which are those known as Ameripol, Buna and GR–S (both "Hot GR–S" and "Cold GR–S");

(b) Rubbery butadiene-acrylonitrile copolymers, more particularly such copolymers wherein the proportions of butadiene and acrylonitrile range from approximately 80:20 to 55:45;

(c) Organic polysulfide rubbers, which are reaction products of an organic dihalide and an alkaline polysulfide (e. g., sodium polysulfide), for instance polysulfide rubbers known as Thiokol;

(d) Polymers of chloroprene (polymeric 2-chlorobutadiene), for instance products known as Duprene and Neoprene;

(e) Polymers of isobutylene, e. g., the product known as Vistanex;

(f) Butyl rubber, more particularly a rubbery copolymer of, by weight, about 98 parts isobutylene and 2 parts isoprene;

(g) Silicone rubbers; and (h) Plasticized polymers of a vinyl halide, specifically vinyl chloride, e. g., the product known as Koroseal.

Mixtures of a plurality of such rubber polymers in any proportions can be used, if desired, instead of a single polymer.

Any of the above synthetic rubbery polymers can be substituted, in whole or in part, for the particular synthetic rubber employed in Examples 1, 2 and 3.

Based on the total quantity of resin (triazine resin plus elastomer) we prefer to use from about 20% to about 40% elastomer. We may, however, use anywhere from about 10% to about 50% elastomer. The amount is generally varied in order to obtain particular properties desired. For example, greater impact strength and resistance to cracking around inserts is obtained with a proportionately larger amount of elastomer. On the other hand, greater rigidity and hardness are obtained with less elastomer.

Any conventional filler may, if desired, be incorporated, alone or in mixtures of two or more, with our elastomer-modified aminotriazine resins in amounts up to about 75%, based on the weight of filled resinous composition. Examples of such fillers include wood flour, alpha-cellulose pulp, calcium carbonate, clay, pigment, talc, mica, etc. We prefer the use of alpha-cellulose pulp, preferably in amounts up to about 50% on the same basis.

If the pH of the modified resin is sufficient low, depending upon the type of reaction, modifiers present, nature of filler, etc., no polymerization catalyst need be added. If the addition of an acid catalyst is desirable or necessary, however, care must be taken to so regulate its acidity that the effect of any rubber-curing agent present in the composition may not be destroyed. Accordingly, we prefer using weak acids such as benzoic acid, salicylic acid, phthalic anhydride, etc., or compounds possessing latent acidity such as ammonium chloride, o-sulfamidomethyl benzoate, monochloracetyl urea, cinnamhydroxamic acid, etc., when a catalyst is used up to about 5% by weight, based on the resin, is generally suitable.

Our molding compositions may be, and preferably are, modified by the addition of rubber-curing agents such as the benzothiazyldisulfide of the specific examples. Lubricants such as the zinc stearate of Examples 1 and 2, pigments, antioxidants to prevent discoloration of the moldings on exposure to heat and light, and the like, may also be present in our compositions.

The molding compositions of the present invention may be prepared in a number of ways. As set forth in the specific examples, all of the ingredients may be first blended and then sheeted on rolls, or the elastomer may be sheeted on rolls and the rest of the ingredients there added. Furthermore, all of the ingredients may be combined in a Banbury or similar intensive mixer.

Molding compositions described in the present specification possess advantages over molding compositions containing either phenolic or melamine resins. As pointed out, known combinations of phenolic resins with elastomers are dark in color and therefore unattractive for most applications. Since the melamine resins are not compatible with the elastomers, their use, in order to take advantage of their good color, in molding compositions having good flow and handling characteristics and low bulk factor to produce molded articles of high impact strength, good insert crack resistance and high deflection, is precluded.

It is an advantage of the present invention that light-colored molded articles of high impact strength, good insert crack resistance and good deflection may be prepared.

It is a further advantage of the present invention that an impact molding composition is produced which can be easily handled in compression or transfer molding because of its low bulk factor and good flow.

We claim:

A molding composition comprising a uniform, hot blended, compatible mixture of (1) a fusible, thermosetting resinous condensation product of formaldehyde and benzoguanamine, the molar ratio of formaldehyde to benzoguanamine ranging from about 1:1 to 4:1, and (2) a rubber-like copolymer of butadiene and acrylonitrile, the amount of said rubber-like copolymer being from about 10% to about 50%, by weight, based on the weight of the total resin content thereof.

References Cited in the file of this patent

UNITED STATES PATENTS

| | | |
|---|---|---|
| 1,783,167 | Bruson | Nov. 25, 1930 |
| 2,385,766 | Thurston | Sept. 25, 1945 |
| 2,517,824 | Appelquest | Aug. 8, 1950 |

FOREIGN PATENTS

| | | |
|---|---|---|
| 567,063 | Great Britain | Jan. 26, 1945 |
| 871,893 | France | Jan. 22, 1942 |